(12) United States Patent
Delaney et al.

(10) Patent No.: US 7,427,449 B2
(45) Date of Patent: Sep. 23, 2008

(54) INTEGRATED OXYGEN GENERATION AND CARBON DIOXIDE ABSORPTION METHOD APPARATUS AND SYSTEMS

(75) Inventors: Michael E. Delaney, Columbia, MD (US); Thomas H. Elledge, Jr., St. George, SC (US)

(73) Assignee: General Dynamics Information Technology, Inc., Fairfax, VA (US)

( * ) Notice: Subject to any disclaimer, the term of this patent is extended or adjusted under 35 U.S.C. 154(b) by 509 days.

(21) Appl. No.: 10/493,481

(22) PCT Filed: Oct. 22, 2002

(86) PCT No.: PCT/US02/33479

§ 371 (c)(1), (2), (4) Date: Apr. 23, 2004

(87) PCT Pub. No.: WO03/054508

PCT Pub. Date: Jul. 3, 2003

(65) Prior Publication Data

US 2005/0031522 A1  Feb. 10, 2005

Related U.S. Application Data

(60) Provisional application No. 60/330,466, filed on Oct. 23, 2001.

(51) Int. Cl.
*C01B 13/02* (2006.01)
*C01B 31/24* (2006.01)
*H01M 8/18* (2006.01)

(52) U.S. Cl. ............................ 429/19; 60/721; 422/122; 423/419.1; 423/579

(58) Field of Classification Search ............... 423/419.1, 423/430, 579; 422/122, 211, 240, 241
See application file for complete search history.

(56) References Cited

U.S. PATENT DOCUMENTS

| | | | |
|---|---|---|---|
| 3,887,696 A * | 6/1975 | Bernard et al. | 423/579 |
| 3,922,146 A * | 11/1975 | Kupka | 422/310 |
| 4,166,536 A * | 9/1979 | Roberts et al. | 206/524.3 |
| 4,238,464 A * | 12/1980 | Gustafson | 423/230 |
| 4,284,879 A * | 8/1981 | Eveson et al. | 219/383 |
| 4,508,700 A | 4/1985 | Hoshiko | |
| 4,683,130 A | 7/1987 | Ueno et al. | |
| 5,665,316 A | 9/1997 | Salonia et al. | |
| 6,143,251 A | 11/2000 | Beller et al. | |

(Continued)

*Primary Examiner*—Wayne A. Langel
(74) *Attorney, Agent, or Firm*—Venable LLP; Keith G. Haddaway; Ralph P. Albrecht

(57) ABSTRACT

A method for producing oxygen and absorbing carbon dioxide in a single operation using a solution that contains an oxygen source and a redox partner that can react to form oxygen and a chemical species that can form an insoluble carbonate to precipitate and chemically store carbon dioxide. Carbon dioxide is introduced into the solution and the carbonate precipitates as the oxygen is generated. In particular, the invention uses an aqueous solution of permanganate and hydrogen peroxide that react in the presence of a catalyst to produce oxygen and manganese (II) ions. Carbon dioxide gas introduced into the solution reacts with the manganese (II) ions to precipitate manganese carbonate. Other cations capable of reacting with carbon dioxide to form an insoluble carbonate, for example calcium, barium and magnesium, may also be added to the solution to precipitate carbonate salts. Calcium permanganate may used as a source of both calcium and permanganate.

43 Claims, 4 Drawing Sheets

U.S. PATENT DOCUMENTS 6,790,417 B2 * 9/2004 Boger .................. 422/222
2002/0001548 A1 * 1/2002 Yoshida et al. ............ 422/120
2002/0197194 A1 * 12/2002 Machado et al. ............ 422/190

* cited by examiner

INTEGRATED OXYGEN GENERATION AND CARBON DIOXIDE ABSORPTION METHOD APPARATUS AND SYSTEMS

BACKGROUND OF THE INVENTION

1. Field of the Invention

The present invention relates generally to an integrated system for generating oxygen and absorbing carbon dioxide. More particularly, the invention relates to an oxygen generating and carbon dioxide absorption method and apparatus that may be used as part of a self contained power supply system for autonomous vehicles.

2. Related Art

Conventional applications for vehicles and devices operating where sufficient quantities of oxygen cannot be directly extracted from the operating atmosphere, and which require control of carbon dioxide and/or sulfur emissions in the operating atmosphere, do not provide for the use of hydrocarbon fuels to provide mechanical, electrical, and/or thermal energy. Such applications may include, but are not limited to, closed environments such as those found on manned and unmanned autonomous vehicles (AVs). Examples of AVs include, for example, autonomous underwater vehicles, space exploration vehicles, or any other vehicles or devices operating in oxygen poor or otherwise adversely contaminated atmospheres, such as robots or remote control devices for exploring toxic, dangerous or environmentally contaminated atmospheres or oxygen limited environments. The invention is not limited to use in unmanned vehicles, but may also be employed in manned vehicles, particularly where a closed atmosphere is required and/or size constraints are present.

Unmanned vehicles that are released from a host vehicle to perform an autonomous mission contain sensor, navigation, communication and robotic systems worth large amounts of money. Reliable power is required to ensure that the mission is accomplished and the vehicle and its valuable cargo is recovered.

Energy system technology may be the most limiting factor for vehicle operating endurance, size, speed, and, ultimately, cost. Conventional energy systems available for powering AVs include rechargeable lithium polymer ion batteries. However, these systems do not possess a sufficiently high power density. Lithium thionyl chloride batteries may also be used; however, these are not rechargeable, are very expensive and pose undo environmental risks.

Leading candidates for AV power technologies involve the application of fuel cells and micro-turbines. Both fuel cells and micro-turbines are at varied stages of development by both commercial and military organizations. The use of other power generating means, for example Brayton cycle engines and Sterling engines, is also contemplated. There is a continuing need for technological developments in fuel cell, micro-turbine and other energy generating systems to significantly increase power and energy densities and expand the use of AVs.

Common to many of the power and energy systems that may be employed in AVs are the requirements for oxygen generation and for byproduct management. Oxygen is typically needed for the combustion of fuel, whether that fuel is a liquid hydrocarbon, a gas such as, for example, hydrogen, or a solid oxide, and whether the fuel is burned to drive a generator such as a turbine or used in a fuel cell. Typically, byproduct management involves at least the management of carbon dioxide. Management, as used here, means the storage, reaction, use or disposal of carbon dioxide in a manner consistent with the use of the AV. For example, carbon dioxide may be pumped out of the system, mechanically stored, or chemically stored by conversion to some other entity. Typically, current systems either store carbon dioxide as the compressed gas or pump the gas into the environment outside the AV. Either of these represents a parasitic energy loss to the system as a whole.

There are numerous conventional schemes to produce oxygen that might be used in an AV or other device requiring oxygen to provide power. The burning of sodium chlorate candles, electrolysis, or the thermal decomposition of hydrogen peroxide are known examples. There are also numerous methods of absorbing carbon dioxide or sulfur byproducts such as the use of methyl ethyl amine, lithium hydroxide or calcium oxide absorbents. Some submarines, for example, additionally employ a closed air system for diesel engines that removes carbon dioxide, normally using a chemical absorbent, thus allowing the production of electrical power without surfacing or snorkeling.

For use underwater, in an oxygen deficient environment or under other strenuous operating conditions, an AV must often possess a closed atmosphere. Oxygen, or its chemical precursors, can be loaded on the AV by a host vehicle which is usually manned. The sourcing of oxygen may be one of the greatest challenges for AV design.

The simplest and most straightforward oxygen source is compressed gas. For the purposes of comparison, an exemplary total AV energy requirement of 96.5 kW-hr is assumed. This represents the energy that may be required for a small platform unmanned vehicle to complete a proposed AV mission. Under this assumption and utilizing a proton exchange membrane (PEM) fuel cell employing reformed diesel as a fuel source (see below) as a model for calculating oxygen need, about 1270 moles or 40 kg of oxygen are required. At a storage pressure of 5000 psi, this represents a volume of approximately 83 liters, corresponding to two bottles, each 100 cm long, 25 cm in diameter, and made of 1.25 cm thick material. However, two tanks of this size preclude the loading of any other power plant elements in this specific AV environment. If the volume were reduced to one cylinder of this size, a pressure of 10,000 psi would be required which far exceeds the pressure handling properties of typical materials used in thin walled tanks.

Smaller diameter cylinders may use more effectively the limited volume available for the typical small platform AV power plant. Two cylinders, 17 cm in diameter and 100 cm in length, a size reasonable for integration into an AV, would need to be pressurized to over 12,000 psi to meet the needs of the mission. Again, materials are not currently available that would be satisfactory for this application. For 17 cm diameter tanks pressurized at 7500 psi, the tanks must be about 169 cm long. While this may be sufficient for some applications, mechanisms for further reducing the size of the oxygen source are desirable. While these size constraints may be specific for a particular application, the advantage inherent in reducing size and weight of the power plant in any AV is readily apparent to persons skilled in the art.

Chemical schemes for oxygen generation are well known. Oxygen has been routinely produced in the laboratory for many hundreds of years. Available methods for generation of oxygen include high temperature decomposition of inorganic compounds, thermal decomposition of organic compounds and thermal decomposition of hydrogen peroxide.

Laboratory oxygen production has been the subject of much scientific activity since the $18^{th}$ Century. Work by Priestly, Scheel and Lavoisier provided many basic processes that produce this gas. Early techniques involved oxygen production by thermal decomposition, for example by heating an oxide of mercury, lead or manganese or potassium nitrate. These thermal decompositions all occur at elevated temperatures. Further, these oxygen precursors are not replenishable from the host vehicle used to launch AVs. Mercury and lead compounds are also not compatible with the tenets of atmosphere and material controls in a manned host vehicle. The process to produce oxygen by high-temperature thermal decomposition is also technically difficult in an AV environment.

Other metal peroxides and superoxides, such as those of barium, sodium, and potassium, are potential precursors for the oxygen needed by an AV power plant. These compounds have the same characteristics and inherent problems as the inorganic oxides listed above. Thus, they are not considered viable for use in an AV.

Chlorate compounds are also potential sources of oxygen. Of particular interest are sodium and potassium chlorate. These compounds thermally decompose to oxygen and the corresponding chloride at about 200° C. In the presence of a manganese oxide catalyst, the decomposition of potassium chlorate is driven to completion at 400° C.

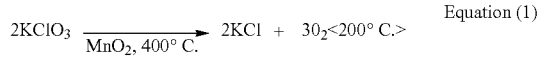

Equation (1)

Equivalent reactions occur for sodium chlorate, which is carried onboard submarines as "oxygen candles" for use in emergency situations. According to Equation 1, 1270 moles of oxygen are produced by 124 kg of starting material. On a weight basis, chlorate decomposition is a very attractive system. However, the chlorate decomposition reaction is very exothermic, although the temperature at which the thermal decomposition occurs, 400° C. (750° F.), is not exceptionally high. This heat energy may be used to pre-heat components for other reactions, such as, for example, combustion. The only energy required to initiate the reaction is a spark. The drawback to using this technology arises from difficulty in controlling the rate of oxygen production.

Reactions of iodates, metaperiodates, peraperiodates, nitrites, and hyponitrites may also be used to generate oxygen; however, the reactions involved are generally less suitable for use in an AV environment than the reactions described elsewhere herein. Thermal decomposition of oxygen rich organics may also have several common drawbacks. Organic compounds are generally volatile, and thermal decomposition might leave a carbon char in the AV that would require cleaning or extra process steps by operators between uses of the AV.

As mentioned above, carbon dioxide is a chemical byproduct of processes utilizing hydrocarbon fuels. Carbon dioxide is produced from hydrocarbons during burning or by conversion into other useful energy sources, such as, for example, hydrogen. Carbon dioxide is produced at a rate of about 70 moles per kilogram of hydrocarbon used. The approximately 1000 moles of carbon dioxide gas produced as a byproduct of the exemplary 96.5 kW hr supply occupies a volume of about 224,000 liters at standard temperature and pressure, which is clearly excessive in the AV environment.

Compression of carbon dioxide requires energy and a dedicated volume for storage. Energy can also be required to pump the gas away from the AV, which may not be possible in certain environments or under certain conditions such as, for example, a mission where non-detectability may be required or where carbon dioxide is not desirable in the surrounding environment. This parasitic energy load also lowers the overall efficiency of the power plant. Furthermore, using the limited volume of a typical AV for a dedicated tank or piping system can occupy volume needed for other functional elements. Clearly, compression or mechanical storage alone are not desirable, and other means for managing waste carbon dioxide are desirable.

Power generation schemes suitable for use in AVs are not limited to those that employ combustion of hydrocarbon fuels. For example, fuel cells, such as, for example, PEM and hydrocarbon direct fuel cells, present another viable alternative. However, use of fuel cells can present additional challenges.

First, hydrogen must be provided for the use of fuel cells. Storing and supplying hydrogen gas directly to the fuel cell is a simple method of providing the fuel. However, storage of hydrogen gas can often be impractical. For example, to meet the exemplary 96.5 kW-hr energy requirement with a 95% efficient PEM cell, approximately 2400 moles, or 5 kg, of hydrogen gas may be required. A 100 cm long 25 cm diameter tank typical for use in AVs can require a storage pressure of 20,000 psi for this amount of gas. This pressure far exceeds the material properties for current thin walled tank technology. If the hydrogen is distributed among three tanks, each tank 17 cm in diameter and 100 cm long, a geometrically advantageous arrangement for a specified application may allow for the inclusion of several tanks of oxygen, also required for the fuel cell. Although this arrangement may increase the available volume for storage of hydrogen, the pressure that would be required still exceeds 15,000 psi, which may far exceed the structural properties of conventional materials for thin wall tank design.

As an alternative to the storage of hydrogen, the gas may be generated onboard the AV. Metal hydrides have a very high weight relative to the amount of hydrogen produced and are thus unsatisfactory for this application. Alternatively, hydrogen may be supplied by the reformation of hydrocarbon fuel, such as, for example, diesel fuel. Reformation of hydrocarbon fuel can present even further challenges. First, any reformation system produces carbon dioxide in addition to hydrogen. Thus, the same challenges exist as for combustion of hydrocarbon fuels, i.e. management of waste carbon dioxide. Reformation also presents the additional challenge of separating hydrogen from carbon dioxide. The reformation of commonly available hydrocarbons also results in hydrogen gas that contains sulfur compounds. Because sulfur compounds can poison components of a fuel cell, they should be removed. Power systems considered for use in AVs that address this challenge are also desirable and not present in existing systems. Low sulfur hydrocarbon precursors may be utilized. These include, for example, synthetic fuels, and low sulfur diesel. These fuel sources may be of limited value because of higher costs and lower availability. Furthermore, use of these fuels presents the same challenges in terms of oxygen requirements and byproduct management. Finally, presently available reformer systems must be modified for use in the AV environment. This area is a source of continuing development.

Unfortunately, conventional oxygen generating systems have never been integrated with a carbon dioxide management function. It would also be desirable for an oxygen generator and/or carbon dioxide absorber to be able to manage sulfur. There is also a continuing need for energy generation systems suitable for use aboard AVs, particularly systems that address the storage and management of gases.

SUMMARY OF THE INVENTION

Oxygen generation and carbon dioxide management functions to support hydrocarbon fueled energy systems have never been combined into one process, much less a process that also allows for sulfur absorption. An exemplary embodiment of the present invention sets forth systems and methods that provide for these combined processes. The system can be weight and volume efficient and can enable use of a closed atmosphere power plant that is both power and energy dense to meet the strict restrictions imposed on autonomous unmanned vehicles and that may be present on manned vehicles.

In its broadest sense, the invention is a method for producing oxygen and absorbing carbon dioxide in a single operation using a solution that contains an oxygen source and a redox partner. The components are capable of reacting to form oxygen and a chemical species that can form an insoluble carbonate to precipitate and chemically store carbon dioxide. Carbon dioxide can be introduced into the solution and the carbonate precipitates as oxygen is generated.

In particular, the invention may use an aqueous solution of permanganate and hydrogen peroxide that react in the presence of a catalyst to produce oxygen and manganese (II) ions. Carbon dioxide gas introduced into the solution reacts with the manganese (II) ions to precipitate manganese carbonate. Other cations capable of reacting with carbon dioxide to form an insoluble carbonate, for example calcium, barium, magnesium, silver, strontium, nickel, cadmium, cobalt, copper, iron and lead, may also be added to the solution to precipitate carbonate salts. Calcium permanganate may used as a source of both calcium and permanganate.

Carbon dioxide may be introduced into the solution through a diffusor or atomiser. The catalyst for the reaction of permanganate and hydrogen peroxide may be iron, copper, platinum, or nickel, as well as any other catalyst. The catalyst is contained on a solid or perforated plate that may be made of or coated with the catalyst. In embodiments utilizing a reformer to produce hydrogen, carbon dioxide may be introduced as an admixture with hydrogen gas. In this case, the hydrogen gas does not undergo a chemical reaction in solution, but is removed for use in, for example, a fuel cell or a combustion process. Any residual carbon dioxide may be removed from the solution as a gas, or chemically reacted with other added cations. Any sulfur present in the carbon dioxide gas as sulfide or sulfur oxide gases, which are converted to sulfate and sulfite in solution, may also be removed by reaction with manganese (II) or other added ions.

In another aspect, the invention is an apparatus for practicing the method described above. An exemplary embodiment of the apparatus includes a tank for holding the permanganate/hydrogen peroxide solution. The tank is made of or lined with a material that does not catalyze the reaction of permanganate ion with hydrogen peroxide, for example polytetrafluoroethylene (PTFE), carbon fiber or a composite. The tank also includes an inlet to introduce carbon dioxide, for example a diffusor or atomizer, and an oxygen outlet to allow oxygen gas to escape. The catalyst may typically be iron, copper, nickel or platinum, but any suitable catalyst may be used.

In applications that use hydrogen gas from a reformed hydrocarbon fuel, an exemplary embodiment of the tank has at least one plate separating it into at least a first and a second fluidly connected chamber. The first chamber contains the carbon dioxide inlet and hydrogen gas outlet and the second chamber contains the oxygen outlet. The oxygen outlet may include a membrane selectively permeable to oxygen and the hydrogen gas outlet may include a membrane selectively permeable to hydrogen.

In another aspect, the invention is a system for generating power in an autonomous vehicle that includes a power generator for generating power or electricity, and the integrated oxygen generator/carbon dioxide absorber of the invention. The oxygen generator/carbon dioxide absorber can provide oxygen to the power generator and absorb waste carbon dioxide. The power generator may be, for example, a turbine, a fuel cell, an internal combustion engine and a heat powered engine such as a Brayton cycle engine or Sterling engine.

In exemplary embodiments having power generating systems that use a reformer to provide hydrogen to a fuel cell, the oxygen generator/carbon dioxide absorber also has a hydrogen outlet and a partition separating the tank into two or more hydraulically connected chambers. The carbon dioxide inlet and hydrogen outlet are in one chamber and the oxygen outlet is in a different chamber. To assure purity of the hydrogen and oxygen, the hydrogen outlet may include a membrane selectively permeable to hydrogen and the oxygen outlet may include a membrane selectively permeable to oxygen. Hydrogen and carbon dioxide from the reformer are introduced as a mixture into the solution through the carbon dioxide inlet, hydrogen passes through the solution without reacting and passes through the hydrogen outlet to the fuel cell. Oxygen similarly flows from the oxygen outlet to the fuel cell. The fuel cell may be a PEM fuel cell, with the oxygen outlet connected to the cathode side of the fuel cell and the hydrogen outlet connected to the anode side of the fuel cell. The hydrocarbon fuel for the reformer may be, for example, diesel fuel, methanol, fuel oil, ethanol or gasoline.

In another exemplary embodiment, the system may use a hydrocarbon direct fuel cell as a power generator where a waste outlet from the fuel cell is connected to the carbon dioxide inlet. A hydrocarbon direct fuel cell may use, for example methanol, ethanol, diesel fuel or gasoline as fuel.

In yet another exemplary embodiment, power may be generated from combustion of hydrocarbon fuel, for example, methanol, ethanol, diesel fuel, fuel oil or gasoline. This embodiment also includes an exhaust outlet for exporting waste from combustion of the hydrocarbon fuel to the carbon dioxide inlet of the oxygen absorber. Alternatively, the combustion may supply heat to a heat powered engine such as, for example, Brayton cycle engine or Sterling engine.

In any of the above embodiments, excess heat that is produced during power generation can be used to power a heat powered engine such as, for example Brayton cycle engine or Sterling engine to generate additional power.

The present invention succeeds where previous efforts have failed in providing an oxygen generating system viable for use aboard an AV coupled with a carbon dioxide and/or sulfur absorbing function. The system is flexible in that it may be adopted to a variety of energy producing systems. For example, the invention can allow the use of fuel cells without requiring the storage of gases at prohibitively high volumes or pressures.

The present invention differs from conventional systems and methods by including features and advantages which were not previously known or suggested. For example, no known system integrally manages both oxygen production and waste product management.

The present invention provides advantages that were not previously appreciated including, for example, by increasing the variety of energy generating options in an AV environment. The system can also integrate several independent functions into a single device, allowing for a further reduction of overall size in a size restricted environment. The invention also allows for modification of existing systems that were not previously thought achievable. For example, the invention provides a viable means for the design of new onboard hydrocarbon reformation systems by providing an independent mechanism for removing sulfur contaminants from the hydrocarbon fuel. The invention also allows for the provision of gases needed for power generation and disposal of waste gas in a closed environment.

The present invention satisfies a long felt need for an efficient, replenishable energy source for AVs.

The present invention allows for significant improvement in mission duration over conventional technologies. Longer mission duration translates into a reduced number of vehicles required to accomplish the same task, thus reducing acquisition costs. The invention advantageously reduces cycle time between missions further reducing the number of vehicles required as well as minimizing the time required by the host vehicle to remain on station.

The present invention also significantly reduces the cost for energy aboard an AV, which may be reduced from the tens of thousands of dollars using lithium thionyl chloride batteries to a few dollars (<$100) to replenish the hydrocarbon fuel and the chemicals used in systems that utilize the present invention.

The present invention enables creation of a true power-dense system that expands the operability, and thus the use and acceptance, of AVs such as submarines and robotic vehicles.

The present invention is the first system that combines both the functions of carbon dioxide absorption and oxygen generation in a single process. The advantage of this invention is that it combines the two functions required for closed-environment hydrocarbon-based energy production into a volume dense package. This enables systems such as autonomous underwater vehicles to operate with devices such as gas turbines, internal combustion engines or fuel cells, much more effectively than has ever been previously accomplished.

Further features and advantages, as well as the structure and function of preferred embodiments will become apparent from a consideration of the following description, drawings, and non-limiting examples.

BRIEF DESCRIPTION OF THE DRAWINGS

The foregoing and other features and advantages of the invention will be apparent from the following description of embodiments of the invention, as illustrated in the accompanying drawings wherein like reference numbers generally indicate identical, functionally similar, and/or structurally similar elements.

DETAILED DESCRIPTION OF THE PRESENT INVENTION

Figure 1:
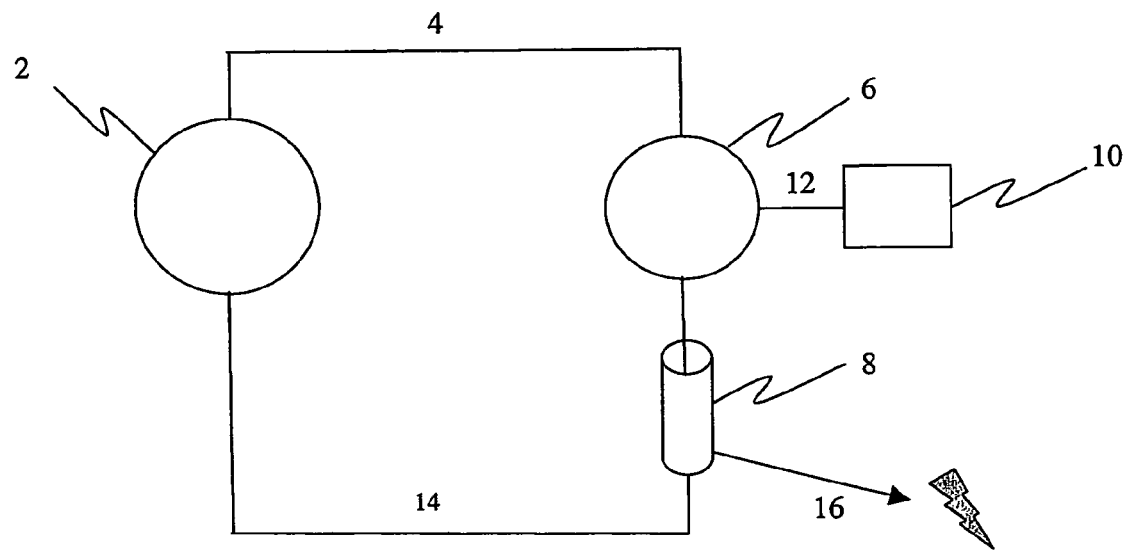
FIG. 1 is a schematic diagram of an energy generating system according to an exemplary embodiment of the present invention incorporating a combustion system for power generation.

Embodiments of the invention are discussed in detail below. In describing embodiments, specific terminology is employed for the sake of clarity. While exemplary embodiments are discussed, it should be understood that this is done for illustration purposes only. The invention is not intended to be limited to the specific terminology selected or the specific embodiments described. A person skilled in the relevant art will recognize that other components and configurations can be used without parting from the spirit and scope of the invention. All references cited herein are incorporated by reference in their entirety as if each had been individually incorporated.

The present invention produces oxygen and absorbs carbon dioxide and other byproducts produced during the oxidation (combustion) or reformation of hydrocarbons and other chemical species. The oxidation process is typically used to produce mechanical, electrical, or thermal power. The present invention uses a unique and energy dense process to enable an energy generating process to be compatible with operations requiring a small footprint or requiring a closed environment. Closed environment operations are required of any vehicle or process designed to operate underwater, in extra-atmosphere or in atmospheres that may be contaminated or otherwise lack the sufficient oxygen to support efficient chemical conversion of the required chemical species. The oxidation of hydrocarbons or other chemical species is the basis for the conversion of chemical energy to useful power typically used for motive force, for ancillary uses, or for the production of electrical power. This technology provides an improvement over batteries or other technologies currently employed for these purposes.

The present invention provides a supply of oxygen suitable for the support of the oxidation of chemical species such as, but not limited to, the combustion of hydrogen or hydrocarbon fuel or the operation of a fuel cell. As used herein, hydrocarbon and hydrocarbon fuels include, for example, diesel, gasoline and fuel oil, as well as other organic compounds, such as, for example, methanol and ethanol. The invention also provides a chemical sink for the byproducts, for example, carbon dioxide, of any hydrocarbon oxidizing process including hydrocarbon combustion and systems requiring hydrocarbon reformation. The invention also incorporates the ability to remove impurities such as sulfur from the fuel stream. Such impurities are common in typical hydrocarbon fuels. Even in minute quantities, sulfur can permanently damage a fuel cell or other systems that involve a catalyst. Sulfur can also bind with other chemicals to form unwanted corrosive substances.

The present invention provides an integrated oxygen generating and carbon dioxide absorbing method and apparatus for use in a power generating system. Although the invention is described for AVs, there may be other applications as well, in particular, manned vehicles operating in an adverse atmosphere, including underwater. Various exemplary embodiments including three involving physical variations for a closed air power generating system are described herein. All variations use the same basic chemical processes for oxygen generation and carbon dioxide management. The first variation supports systems utilizing hydrocarbon fueled gas turbines or internal combustion engines for power generation.

This variation may also be used for systems employing heat powered engines, for example, a Brayton cycle engine or Sterling engine where the required heat energy is supplied by combustion of hydrocarbon fuels or hydrogen. Heat powered engines may also be incorporated into other power generation systems, for example a turbine, to recapture heat energy and convert it into usable power. The second variation supports a fuel cell that has a direct feed of methanol or other hydrogen precursor. This includes solid oxide fuel cells or other fuel cells that do not require a separate reformation process. The third variation supports a reformed hydrocarbon-fed fuel cell, for example, a PEM fuel cell. Other power generation schemes are envisioned.

The byproducts of AV power plant operations—carbon dioxide, sulfur, water, and heat—should be managed. Processes developed to mitigate the effects of these byproducts should avoid parasitic electrical power drains. It is also desirable to use waste energy in the process wherever prudent. Implementing one or more of these design tenets helps ensure an energy efficient AV power plant. Whatever the ultimate power generating source, there are several common problems that the present invention seeks to solve. First, an oxygen source is needed for combustion. Second, carbon dioxide produced, either from reformation of hydrocarbon fuel or by combustion of hydrocarbon, should be managed.

An exemplary embodiment of the present invention in the AV environment uses hydrogen peroxide as an oxygen rich precursor to generate oxygen. Thermal decomposition of hydrogen peroxide over a catalyst can produce the necessary oxygen according to Equation 2:

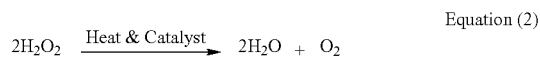

Equation (2)

However, concentrated hydrogen peroxide is highly reactive—it is used as rocket fuel—and is explosive in high concentrations. Consequently, this substance must be diluted to concentrations below its explosion limit. For example, 70% or lower by weight, or a 1:1 molar ratio or lower with water, is below the explosion limit and is considered an optimal concentration.

To meet the 1270 mole oxygen requirement and assuming an 80% utilization rate, using Equation 2, the required amount of oxygen is about 1500 moles and the corresponding amount of hydrogen peroxide is 3000 moles. For the exemplary 96.5 kW-hr power requirement, this solution weighs about 150 kg and occupies 170 liters. Thus, while hydrogen peroxide, as a liquid, may be simpler to arrange in an AV environment than the fixed geometry cylinders of a high-pressure gas, the required volume leaves little room for the other essential elements of the energy system. A more volume effective process is desirable to provide oxygen.

Oxidation-reduction (redox) reactions are a viable alternative to other chemical processes for the production of oxygen. Compounds potentially useful to produce oxygen by redox mechanisms include the oxygen rich permanganates, chlorates, perchlorates, phosphates, sulfites, and thiosulfates. The present invention utilizes an oxygen source as a first redox reactant and a second redox reactant, which may be neutral or ionic, such that the resulting reaction simultaneously generates oxygen and creates a carbon dioxide sink. Hydrogen peroxide is a particular example of an oxygen source. Permanganate is an example of a species, in this case an anion, which, in conjunction with the hydrogen peroxide as the oxygen source, satisfies the requirements set forth above. In principle, any neutral or ionic species may be used which, after reaction, generates oxygen and a species that may be used to precipitate carbon dioxide as a carbonate salt. A permanganate ion/hydrogen peroxide system is an example of a redox system to generate oxygen and has an added benefit in that it creates an integrated chemical sink for carbon dioxide.

Permanganate ion and hydrogen peroxide undergo a redox reaction in the presence of a catalyst as shown in Equation 3:

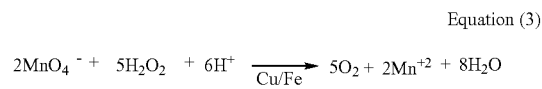

Equation (3)

Conventionally, iron and copper catalysts are utilized for this reaction, although any metal, ceramic or plastic catalyst that catalyzes the reaction is acceptable. The reaction occurs in aqueous solution and the rate of the process may be controlled by the temperature of the solution, the area of the catalytic surface, or the pH.

A salient characteristic of this reaction is that it produces manganese (II) ions. Manganese (II) precipitates carbonate, the solvation product of carbon dioxide, according to Equation 4:

Equation (4)

The solvation of carbon dioxide also produces the hydronium ions required in the oxidation-reduction reaction as shown in Equation 5:

Equation (5)

This process provides the chemical sink required to remove carbon dioxide from the system. The solvation of carbon dioxide in turn produces the hydronium ions required in the permanganate/hydrogen peroxide redox reaction.

The above redox process thus represents an example of the first step in the integrated oxygen generator and carbon dioxide absorber of the present invention. Any salt that generates permanganate may be used as a permanganate source. However, the choice of cation for permanganate may further enhance the ability of the system to provide a chemical sink for carbon dioxide. Advantageous cations are those that form soluble permanganate salts and insoluble carbonates. Insoluble carbonates are those having a $K_{sp}$ of less than about $10^{-6}$. Examples of cations that form insoluble carbonates include calcium, barium, magnesium, silver, strontium, nickel, cadmium, cobalt, copper, iron and lead.

Calcium (II) ion is an example of a cation that fits these criteria. It precipitates carbonate ion from solution according to Equation 6:

Equation (6)

Although calcium may be used as a counterion for permanganate, any water soluble calcium ion source may be incorporated into the aqueous hydrogen peroxide solution. These include, for example, calcium chloride and calcium acetate. Any other cation that forms an insoluble carbonate salt may be similarly employed. Cation sources that may be used as buffers for the aqueous oxygen generating solution may serve two functions—introduction of buffer and carbon dioxide sink. Divalent cations ($Ca^{2+}$, $Ba^{2+}$, etc.) have the added advantage of capturing more carbonate than monovalent ions on a molar basis. Trivalent (or tetravalent, etc.) cations may consume even more carbonate. Calcium permanganate, $Ca(MnO_4)_2$, is not toxic and easily packaged for handling.

Calcium permanganate is therefore an advantageous salt to use as a permanganate ion source with 70% hydrogen peroxide in the present invention. The combination of potassium permanganate and calcium oxide may also be used. This combination also offers opportunities for rate control of the reaction.

The total mass of a calcium permanganate/hydrogen peroxide system required to produce the 1500 moles of oxygen (1270 moles of oxygen utilized at 80%) for the exemplary 96.5 kW-hr power requirement is 121 kg. This total includes the mass of the 70% $H_2O_2$ solution required and the mass of permanganate ion, calculated as $Ca(MnO_4)_2$. Use of a monovalent cation would require a slightly higher mass, but this is well within the constraints imposed by the AV environment. As referred to above, the required hydronium ions are produced from the dissolution of carbon dioxide. Importantly, the volume required for this process can be approximately 85 liters, significantly less than the 170 liters using $H_2O_2$ alone, and also significantly less than the volume that would be required when using compressed oxygen.

Another common problem, particularly in the reformation of hydrocarbon fuels for use in fuel cells, is the presence of sulfur. In systems that use fuel cells requiring hydrogen gas for power generation, such as, for example, a PEM fuel cell, sulfur present in the hydrogen stream may permanently damage the fuel cell and render it inoperable. A fuel cell exposed to even low concentrations of sulfur compounds for very short periods may be permanently poisoned and disabled.

The sulfur compounds in the hydrogen or hydrocarbon fuel typically occur either as the oxides, which are hydrated to form, for example, sulfites and sulfates in aqueous solution, or as sulfides. Sulfur may be present in the gas evolved from the reformation process of hydrocarbon fuels that provides the hydrogen source. Thus, it is desirable to include elimination of sulfur compounds in any process that uses hydrocarbons as a fuel source in the reformation process to produce hydrogen for use in fuel cell. In addition, sulfur compounds may be produced from the combustion of hydrocarbon fuels in, for example, a hydrocarbon fired turbine power supply. Although not as detrimental to system operation as in a fuel cell, these sulfur compounds may also contaminate the atmosphere in an AV and removing them may therefore be desirable in certain circumstances, e.g., when operating in a closed atmosphere.

The carbon dioxide control system of the present invention has the added benefit of functioning to remove sulfur compounds. Sulfur containing contaminants from the reformation process or hydrocarbon combustion are present in the carbon dioxide stream introduced into the integrated oxygen generator/carbon dioxide absorber of the present invention. Sulfur oxides and sulfides from the hydrocarbon are soluble in aqueous solution. Sulfides and sulfates will precipitate with manganese (II), calcium (II) and/or other cations that may be added to the solution. Suilfr oxides from the combustion or reforming process become the sulfates or sulfites upon solvation. The reactions controlling these processes in aqueous solution are represented by the following reactions:

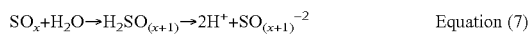

Equation (7)

(x=2 or 3, typically)

Equation (8)

(M=Mn or Ca or others)

The sulfite and sulfates are thus also captured in the oxygen generator/carbon dioxide absorber. In addition to capturing sulfur contaminants, this aspect of the present invention allows for a significant reduction in the size of the reformer system, which no longer needs to provide an independent system for eliminating sulfur. This improves the overall performance of the power generation system.

FIG. 1 is a schematic diagram of an exemplary embodiment energy generating system according to the present invention incorporating a combustion system for power generation. The oxygen generator/carbon dioxide absorber 2 of the present invention produces oxygen that is fed through an outlet and is transported through an external oxygen line 4 to the combustor 6. Hydrocarbon fuel stored in a separate fuel tank 10 is fed to the combustor 6 through a separate line 12. The combustor 6 powers a combustion driven power generator 8 for the generation and output of power 16. Examples of combustion driven power generators include a turbine, a generator driven by an internal combustion engine and heat powered engines. A heat powered engine is an engine that converts heat energy into power, for example a Brayton cycle engine or Sterling engine. Exhaust from the combustor 6 is fed through an exhaust line 14 leading back to the oxygen generator/carbon dioxide absorber 2. Carbon dioxide and, if present, sulfur compounds in the exhaust are removed by precipitation with manganese, calcium and/or other ions in the oxygen generator/carbon dioxide absorber 2. The heat generated by the combustor 6 in a turbine or internal combustion generator may additionally be used by a heat powered engine to generate additional power and increase efficiency.

Figure 2:
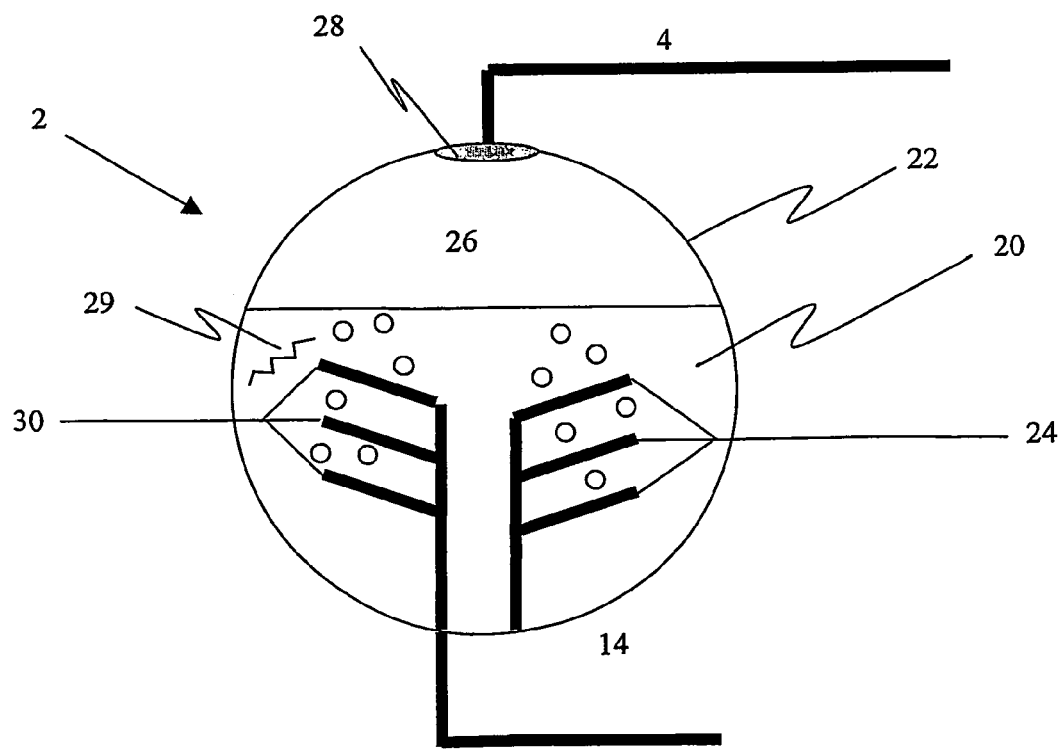
FIG. 2 is an exemplary embodiment of the present invention suitable for use with a combustion system for power generation.

FIG. 2 is an exemplary embodiment of the present invention suitable when a combustion system is used for power generation. The permanganate/hydrogen peroxide solution 20 is contained in a tank 22. The solution may include other components, for example, buffers or one or more inorganic salts. The buffer or other inorganic salt may comprise a cation that forms an insoluble carbonate, for example, calcium, barium and magnesium. The tank is made from or lined with a non-catalytic material to suppress oxygen formation. This material may be, for example, polytetrafluoroetylene (PTFE or Teflon), carbon fiber or composites, as well as others. The tank 22 includes a catalyst surface 24 containing a suitable catalyst for the redox reaction (Equation 3) used to produce oxygen.

Oxygen may accumulate in a head space 26, where it is ultimately transported via a external oxygen line 4 to the combustor 6 of the power generator 8. Optionally, the oxygen may exit the tank through a membrane 28 that is selectively permeable for oxygen, although this membrane is not usually necessary when oxygen is used only for combustion. Such membranes include electrolytic membranes as described in U.S. Pat. No. 6,090,265 to Adler, et al. or ceramic electrochemical membranes developed at Lawrence Livermore National Laboratory and described by, for example, Ai-Quoc Pham (See "Making Liquid Fuels from Natural Gas: A Technological challenge of the Twenty-First Century" available at (http://www.vacets.org/vtic97/qaphem.htm, accessed Oct. 4, 2001), which are incorporated by reference herein in their entirety. In order to provide a proper pressure of oxygen, the gas may be pumped using a blower (not shown).

Carbon dioxide is transported from the combustor 6 through an exhaust line 14. The carbon dioxide must be brought in direct contact with the solution to facilitate solvation. Direct contact may be accomplished by bubbling the exhaust gas through a diffuser 30 and into the solution 20 in the tank 22. The diffuser 30 may be, for example, a bubbler or atomize to provide small bubbles of gas. The carbon dioxide then reacts with aqueous manganese (II) ions, produced during the redox reaction that generates oxygen, as well as calcium ions, and/or other ions that may be present to produce insoluble carbonate salts that precipitate from the solution 20. The insoluble carbonate salts are allowed to accumulate in the tank 22.

The carbon generator/carbon dioxide absorber 2 may also include a heat exchanger 29 as a means for preheating the hydrocarbon fuel. The heat exchanger 29 functions to conserve thermal energy, further increasing system efficiency. The heat exchanger may comprise simply routing the hydrocarbon line 12 through the oxygen generator 2, or may use an independent system to transfer heat.

Figure 3:
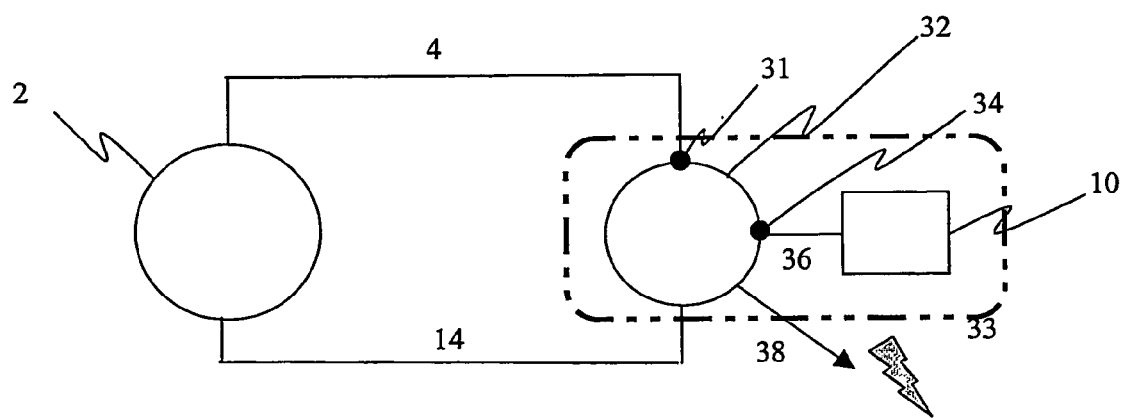
FIG. 3 is a schematic diagram of an energy generating system according to an exemplary embodiment of the present invention incorporating a hydrocarbon direct fuel cell.

FIG. 3 is a schematic diagram of an energy generating system according to an exemplary embodiment of the present invention incorporating a hydrocarbon direct or other hydrocarbon fueled fuel cell 32. The oxygen generator/carbon dioxide absorber 2 of the present invention produces oxygen that is fed through an outlet and is transported through an external oxygen line 4 to the cathode 31 of a hydrocarbon direct fuel cell 32. Hydrocarbon fuel stored in a fuel tank 10 is fed to the anode 34 of the fuel cell 32 through a hydrocarbon line 36. Suitable fuels for such purposes include, for example, methanol, diesel, gasoline, fuel oil, etc. The fuel cell 32 outputs power 38 directly to the AV. Exhaust from reactions within the fuel cell 32 are transported through an exhaust line 14 leading back to the oxygen generator/carbon dioxide absorber 2. Carbon dioxide and, if present, sulfur compounds, are removed by precipitation with the manganese and/or calcium ions in the oxygen generator/carbon dioxide absorber 2.

The oxygen generator/carbon dioxide absorber 2 of FIG. 2 is also suitable for use in this embodiment. Referring now to FIG. 3, to prevent contamination of the fuel cell 32 at the cathode 31, the oxygen supply must be substantially free of contaminants that would adversely affect the efficiency of the fuel cell. Accordingly, an oxygen purification means is more important for this embodiment. The membrane 28 that is selectively permeable to oxygen, such as, for example, those described above, provides such a suitable means.

Figure 4:
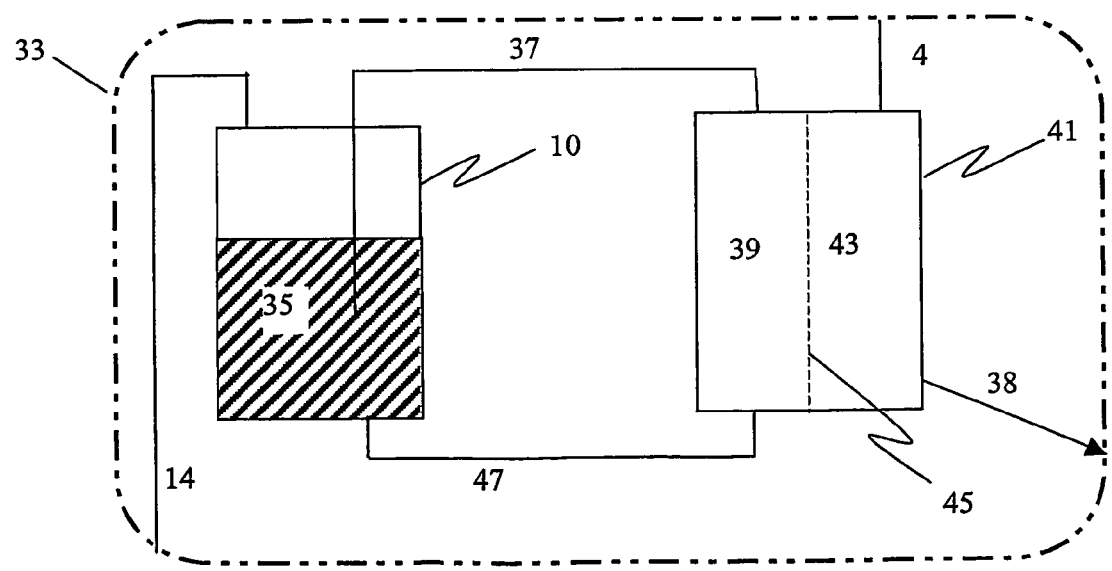
FIG. 4 is an example of an alternative configuration of a fuel cell used as a power system.

It will be appreciated by persons skilled in the art that the fuel tank 10, fuel line 36 and fuel cell 32, that comprise the power system within box 33 of FIG. 3 may be configured differently. FIG. 4 shows an example of an alternative configuration of a fuel cell power system 33 that may be used in the invention. The embodiment of FIG. 4 is, in particular, typical of a direct methanol fuel cell. The hydrocarbon fuel 35 can be stored in fuel tank 10. Fuel can be transferred through line 37 to the anode side 39 of the working cell 41. Oxygen can be transferred from the oxygen generator/carbon dioxide absorber 2 through external oxygen line 4 to the cathode side 43 of the working cell 41. The anode side 39 and cathode side 43 of the working cell 41 are separated by a catalyst impregnated membrane 45, as is known in the art. Fuel mixed with carbon dioxide is transported from the working cell 41 through a waste line 47 to the fuel storage tank 10. The carbon dioxide can exit the storage tank 10 and enter exhaust line 14, where it is returned to the oxygen generator/carbon dioxide absorber 2. Power from the working cell is output 38. It will be understood by persons skilled in the art that this is only one of several embodiments of the power system 33. Other configurations that include the reformation process as part of the working cell 41, for example a solid oxide fuel cell, may use the embodiment of the system depicted in FIG. 3 although the configuration of the power system may vary.

Figure 5:
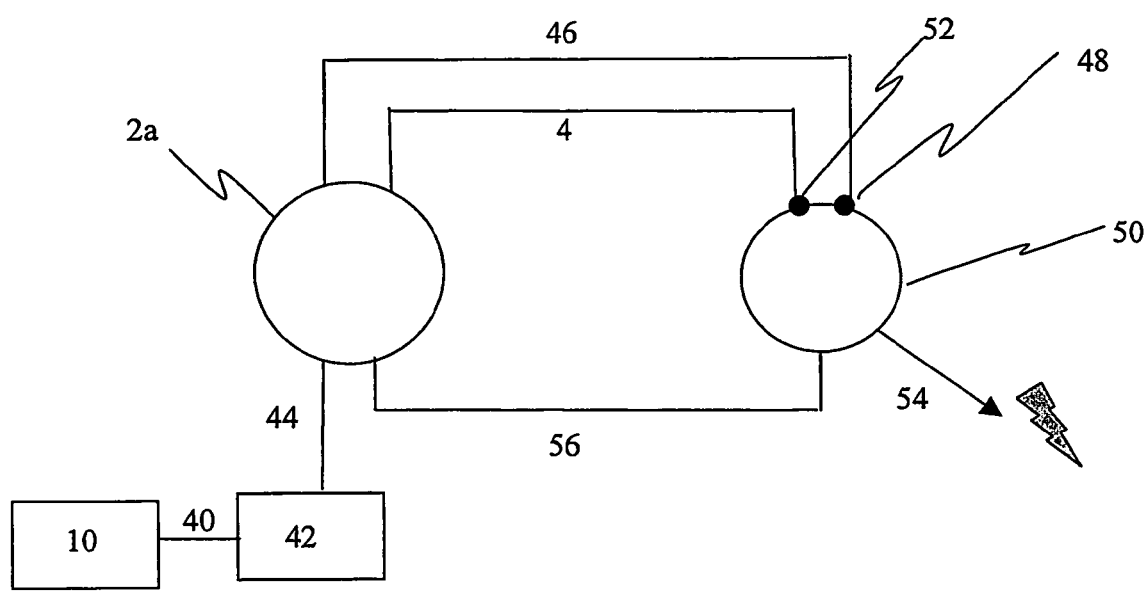
FIG. 5 is a schematic diagram of an energy generating system according to an exemplary embodiment of the present invention incorporating a fuel cell that utilizes hydrogen as a power source.

FIG. 5 is a schematic diagram of an energy generating system according to an exemplary embodiment of the present invention incorporating a fuel cell that utilizes hydrogen as a power source. This system may incorporate a hydrogen source such as, for example, a reformer, that converts hydrocarbon fuel into carbon dioxide and hydrogen. A PEM fuel cell is an example of a type of fuel cell 50 that may be utilized according to this exemplary embodiment, although other systems that utilize hydrogen gas may also be used.

As shown in FIG. 5, a suitable hydrocarbon fuel is stored in a separate fuel tank 10 and transported through a hydrocarbon line 40 to a reformer 42. The reformer 42 may require water or a supply of oxygen. The initial water supply to begin reformer operations, if required, is stored separately. Once the fuel cell 50 begins operating, waste water produced by reactions in the fuel cell may be used as an additional water source for the reformer. Oxygen can be supplied from the oxygen generator/carbon dioxide absorber 2a by a separate feed line (note shown). The output of the reformer 42, which includes hydrogen and carbon dioxide gas, is transported through a reformer output line 44 to the modified oxygen generator/carbon dioxide absorber 2a. In the oxygen generator/carbon dioxide absorber 2a, carbon dioxide is absorbed, as well as any sulfur byproducts generated during the reforming process from sulfur compounds in the hydrocarbon fuel. Hydrogen gas in the reformer stream passes through the oxygen generator/carbon dioxide absorber 2a and is transported through a separate hydrogen line 46 to the anode 48 of the fuel cell 50. Oxygen from the oxygen generator/carbon dioxide absorber 2a is transported through an external oxygen line 4 to the cathode 52 of the fuel cell 50. Oxygen from the oxygen generator/carbon dioxide absorber 2a may also be fed into the reformer 42, if oxygen is required. Power is output 54 directly from the fuel cell 50. Waste from the reactions in the fuel cell 50, which comprises mostly water, is transported through a waste line 56 and into the oxygen generator/carbon dioxide absorber 2a and/or the reformer 42.

Although a particular configuration of fuel tank 10, reformer 42 and fuel cell 48 are shown, other configurations exist. For example, the reformer 42 and fuel cell 50 may be combined. It will be apparent to those skilled in the art how the various components of the present invention can be arranged to incorporate various configurations.

Figure 6:
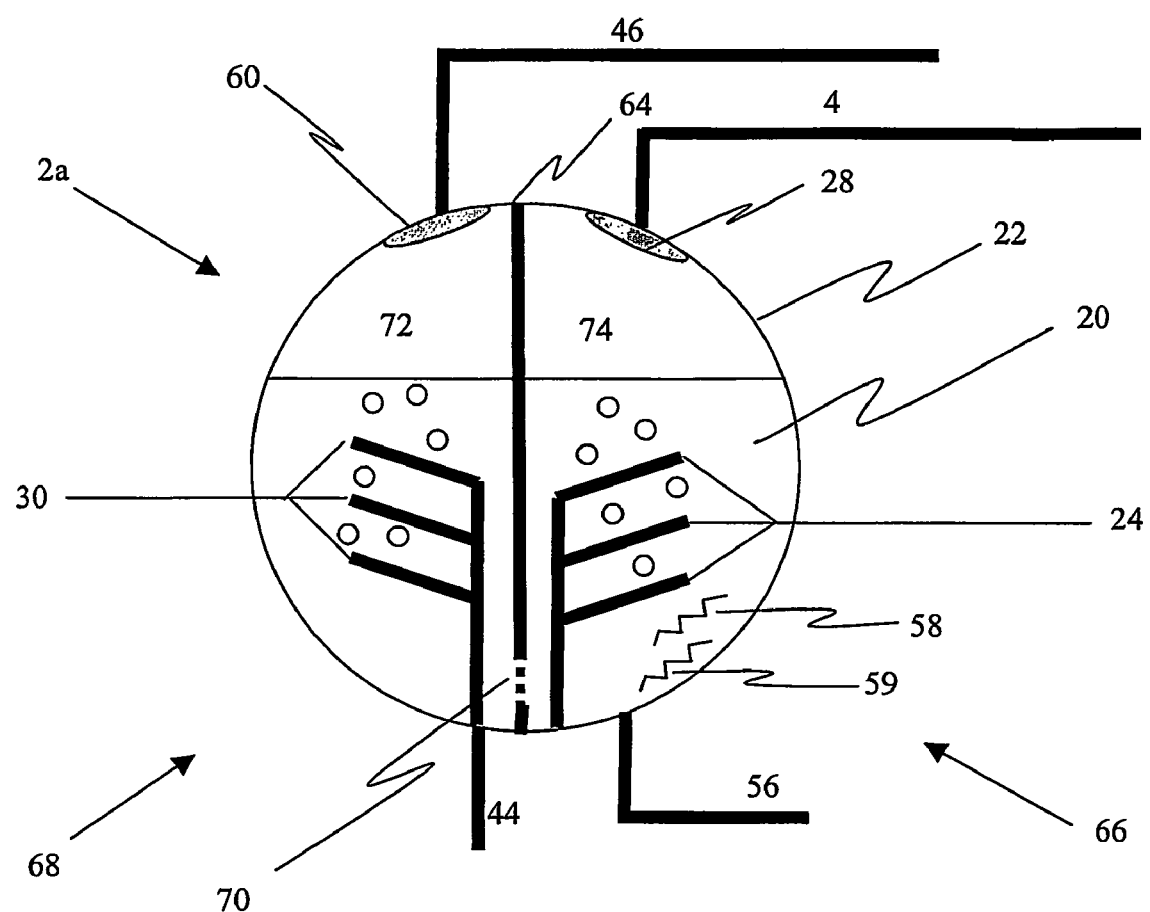
FIG. 6 is an exemplary embodiment of the invention that may be used in a system that utilizes a fuel cell incorporating hydrogen fuel.

FIG. 6 is an exemplary embodiment of the present invention suitable for use in a system that utilizes a fuel cell incorporating hydrogen fuel. As in the embodiment of FIG. 2, the oxygen generator/carbon dioxide absorber 2a of this embodiment utilizes a permanganate/hydrogen peroxide solution 20 contained in a tank 22. The tank 22 is separated into two compartments by a plate 64. The plate 64 separates the tank 22 into an oxygen side 66 and a carbon dioxide/hydrogen side 68. The plate 64 does not completely separate the tank 22 into two compartments, but allows for fluid communication so that permanganate, manganese (II) and other ions required for the various reactions may migrate between the compartments. This may be accomplished, for example, by not extending the plate 64 to the bottom of the tank 22 or by providing holes or other channels 70 in the plate 64 that are below the levels where hydrogen enters the solution and where oxygen is generated. Other methods of maintain fluid connectivity are readily ascertainable to persons skilled in the art. The tank 22 and plate 64 are made of a non-catalytic material to suppress oxygen formation.

The tank 22 includes a catalyst surface 24 containing a suitable catalyst for the redox reaction producing oxygen on the oxygen side 66 of the tank 22. In addition, an inlet (not labeled) is provided for accepting the waste from waste line 56 into the tank 22. An additional outlet (not labeled) is provided on the hydrogen side 68 leading to the hydrogen line 46 that transports hydrogen from the oxygen generator/carbon dioxide absorber 2a. Carbon dioxide and hydrogen from the reformer output line 44 are forced into the solution 20 by creating a fine stream of bubbles with a diffuser 30. To ensure a maximum amount of contact between the gas and the solution, the diffuser may comprise several fine-holed diffusing plates. Hydrogen is collected at the top of the tank in a headspace 72 of the hydrogen side 68 separate from the headspace 74 of the oxygen side 66. The hydrogen provided to the fuel cell 50 should be free of impurities, particularly oxygen. The oxygen generator/carbon dioxide absorber 2a can include a membrane 60 selectively permeable to hydrogen. Membranes 60 are well known and include, for example a palladium alloy membrane as described in U.S. Pat. Nos. 4,472,176 and 4,056,373 to Rubin, which are incorporated herein by reference in their entirety. Hydrogen passing though the membrane 60 may be pumped to the anode 48 of the fuel cell 50 through hydrogen line 46 with a blower (not shown). Similarly, oxygen accumulates in the head space 74 of the oxygen side 66. Because the oxygen supplied to the fuel cell 50 should also be free of impurities, the present embodiment includes a membrane 28 that is selectively permeable to oxygen, as previously described with reference to FIG. 2. Oxygen may also be pumped out with a blower (not shown).

Energy from the oxygen generator/carbon dioxide absorber 2a of FIG. 6 may be used to preheat hydrocarbon fuel and water used in the reformer 42. Thus, a hydrocarbon heat exchanger 58 and/or a water heat exchanger 59 may be incorporated in the oxygen generator/carbon dioxide absorber 2a. The heat exchangers 58 and 59 may be formed by simply routing the waste supply line 56 and hydrocarbon fuel line 40 through the solution 20. Alternatively, a separate heat exchange system may be used as would be apparent to those skilled in the art. This increases system efficiency by effectively conserving heat energy. Heat from the heat exchanger may also be transferred to a heat powered engine to create additional power and improve overall efficiency.

The gas mixture provided to the oxygen generator/carbon dioxide absorber 2a of FIG. 6 from the reformer 42 through output line 44 can contain both hydrogen and carbon dioxide, and possibly sulfur. This gaseous mixture is output through the diffuser 30 into the solution 20. In the solution 20, carbon dioxide and, if present, sulfur compounds are removed by precipitation with manganese, calcium and/or other ions in the solution 20.

To establish stoichiometric relationships, the overall chemical process starting from reactants, diesel, hydrogen peroxide and calcium permanganate must be characterized. A typical reaction for hydrocarbon fuel is shown in Equation 9a. A similar equation using cetane as the fuel is shown in Equation 9b.

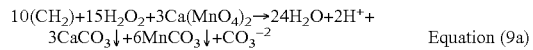

Equation (9a)

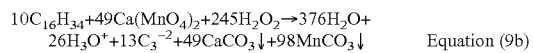

Equation (9b)

As is evident from Equations 9a and 9b, at least one extra mole of carbonate ion is produced from each mole of $CH_2$ used in the process. Even one extra mole of carbon dioxide produced has a potential to overwhelm the volume of the system unless effectively managed. However, the present invention is a significant improvement over conventional systems that required management of all carbon dioxide produced in its gaseous form.

The excess volume of carbon dioxide may be managed in several ways. First, the gas may be compressed and stored onboard the AV. This requires extra energy and storage space, but may be acceptable under appropriate conditions. Second, the excess carbon dioxide may be pumped from the AV to the environment. Compression and pumping represent, however, an overall parasitic energy loss. The components of the fuel cell and/or the AV may be sized to accommodate the excess gas, but this is often not possible in the constrained space of AVs.

An attractive alternative is the chemical storage of the excess carbon dioxide. This may be accomplished by adding salts to the aqueous oxygen generating solution that supply cations capable of forming insoluble carbonate salts. These cations include, for example, calcium, barium and others. As described above, cations added in the form of a buffer or other needed component are advantageous, as are polyvalent ions. Chemical storage offers the advantages of not requiring additional space and not taking energy away from the system.

Because of the design of the present invention, the sulfur removal functionality need not be part of a reformer system that uses diesel or other hydrocarbon fuel. Not having to include a sulfur removing structure in the reformer significantly simplifies the reformation task and can obviate the need for expensive alternative or synthetic fuel.

Reformation of diesel has been accomplished in the laboratory and further development continues.

The use of a fuel cell incorporating hydrogen fuel can also require an additional component of the system for reforming hydrocarbon fuel. The complexity of the reformer may be significantly reduced if synthetic fuel is used as the hydrocarbon fuel because the sulfur removal function is obviated. Syntroleum (manufactured by Syntroleum Corp., Tulsa, Okla., USA) is an example of a commercially available synthetic fuel prepared from methane that uses a mixture of carbon monoxide and water converted to a long chain aliphatic hydrocarbon mixture through a Fischer-Tropsch process. Syntroleum contains neither aromatic hydrocarbons nor sulfur contaminants. An Autothermal Reformer system has potential for success.

Alternative reformer systems can also be used with the present invention. The U.S. Navy's current ship fuel cell program has successfully developed a reformer and Molten Carbonate fuel cell system using diesel as a fuel, although efforts to produce a diesel reformer for PEM fuel cells has experienced technical difficulties and is still under development.

Other technologies are envisioned as well for use in combination with the present invention. Additional processes include, for example, the Novel Hydrogen Generation System produced by TDA Research, Inc. of Wheat Ridge, Colo., USA (TDA) and a plasma system, PEP™, produced by Vanguard Research Incorporated of Fairfax, Va., USA (VRI). TDA reported that the Novel Hydrogen Generation system would never be made small enough to fit the footprint of an AV. The plasma system is attractive because of the natural control of sulfur and other trace contaminants that is inherent to the PEP™ process. Although a VRI designed plasma system would fit the required volume, the VRI plasma system operates with an energy deficit between the energy required to supply the electric torch and the energy value of the hydrogen actually produced. Therefore, the use of the plasma system onboard an AV is not a feasible choice.

Commercial mobile reformer systems concentrate on removing sulfur with a regenerative system. The present invention presents a unique opportunity to design a compact reformer. As previously shown, gas stream clean up and sulfur removal is accomplished by the present invention.

A properly designed reformer for use in conjunction with the present invention need only include a steam reformation unit and a shift converter. This limitation minimizes the size and makes possible a unit that will fit in the footprint of an AV. It is projected that the system design would similar in size to a steam reformer for methanol which, without desulfurization is estimated at 28 kg and 28 liters.

Utilizing the present invention, heat is produced in the fuel cell, the oxygen generator-carbon dioxide absorber and, if present, the reformer of the AV power plant. Heat management is important for several reasons. Heat rejected to the environment may adversely affect the AV thermal signature when such considerations are important such as, for example, in military surveillance vehicles or when the system is used in a heat sensitive environment. Heat produced in the fuel cell should also be removed to protect internal materials. Additionally, the large amounts of heat energy produced to drive the reforming process and the heat energy released in the exothermic redox reaction when generating oxygen are advantageously conserved to improve the efficiency of the overall design.

Energy required to initiate the reformation process that occurs in the reformer is provided by fuel. The reformer may operate at high temperatures and high pressures. Energy can be retained within the reformer structure to ensure an efficient process. A significant insulation package is required. Modern insulation materials can have a thermal conductivity as low as 0.001 W/m–° C. for double evacuated insulation packages. Materials that are more common provide a thermal conductivity of about 0.1 W/m–° C. A reformer made of stainless steel, using 5 cm thick common insulation materials and operating at 900° C. (1800° F.) would conduct approximately 2000 W/m$^2$. It is evident that this is an area of importance when designing the high temperature portions of the reformer system, but may be effectively handled through proper design.

The hydrogen peroxide/calcium permanganate redox reaction that occurs in the present invention is exothermic. The temperatures are not generally high enough to provide thermal energy to the reformer, but may be used to preheat the diesel and water used in the reforming process. To achieve this function, diesel and water preheat systems are installed in the oxygen generator to pre-heat these fluids prior to use in the reformer. This system may be as simple as routing the lines supplying hydrocarbon and water to the reformer through the tank containing the system where the redox reaction occurs. Thus, the present invention presents opportunities for increasing overall efficiency.

The PEM fuel cell, if used, should operate at temperatures less than 90° C. For a typical PEM cell, approximately 5% of the power produced must be removed as heat energy. In a 4 kW system, 200 watts is the maximum heat energy that must be removed. The heat from the PEM fuel cell is typically rejected to the environment. For an ocean temperature of 30° C. (85° F.), a mass flow rate of 60 grams/minute for the cooling system is required. This is generally acceptable for use in presently envisioned systems.

Excess heat may also be used to generate additional power and thus increase overall system efficiency. For example, heat exchangers can be used to transfer energy to heat powered engines. Suitable heat powered engines include, for example, a Brayton cycle engine and a Sterling engine. Heat powered engines convert the excess heat energy to power. Heat losses are thus minimized and efficiency increased.

The present invention is the first system that combines functions of carbon dioxide absorption and oxygen generation in a single process. The advantage of this invention is that it combines the two functions required for closed-environment hydrocarbon-based energy production into a volume dense package. This enables systems such as unmanned underwater vehicles to operate with devices such as gas turbines, internal combustion engines or fuel cells much more effectively than has ever been previously accomplished.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described exemplary embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A method for producing oxygen and absorbing carbon dioxide in a single operation comprising
    providing a solution comprising a chemical species capable of reacting with carbon dioxide to form an insoluble precipitate and an oxygen source and a redox partner, said oxygen source and said redox partner reactable to form oxygen;
    introducing carbon dioxide into said solution;
    contacting said carbon dioxide with said chemical species capable of reacting with carbon dioxide; and
    precipitating said insoluble precipitate from said solution.

2. The method of claim 1, wherein said oxygen source and said redox partner comprise hydrogen peroxide and a permanganate salt and said chemical species capable of reacting with carbon dioxide comprises manganese (II) ion.

3. A method for producing oxygen and absorbing carbon dioxide in a single operation comprising:
    providing a solution comprising a permanganate salt, water and hydrogen peroxide;
    allowing said permanganate salt, water and hydrogen peroxide to react to produce manganese (II) ion and oxygen in the presence of a catalyst;
    introducing carbon dioxide gas into said solution;
    contacting said carbon dioxide with said manganese (II) ion; and
    allowing manganese carbonate to precipitate.

4. The method of claim 3, said solution further comprising a cation capable of reacting with carbon dioxide to form an insoluble carbonate.

5. The method of claim 4, said cation selected from the group consisting of calcium, barium, magnesium, silver, strontium, cobalt, nickel, cadmium, copper, iron and lead.

6. The method of claim 3, said permanganate salt comprising calcium permanganate and further comprising contacting said carbon dioxide with calcium ion in solution and allowing calcium carbonate to precipitate.

7. The method of claim 3, further comprising providing a diffusor or atomiser for introducing said carbon dioxide.

8. The method of claim 3, further comprising removing said oxygen from said solution.

9. The method of claim 3, said catalyst selected from the group consisting of iron, copper, platinum, nickel and combinations thereof.

10. The method of claim 3, wherein said catalyst is in or on a solid or perforated plate in said solution.

11. The method of claim 3, said carbon dioxide introduced as an admixture with hydrogen gas.

12. The method of claim 11, further comprising
    providing a tank separated into a first chamber and a second chamber, said first chamber fluidly coupled to said second chamber, said second chamber further comprising a hydrogen gas outlet, said tank containing said solution, and said oxygen produced in said first chamber; and the method further comprising introducing said carbon dioxide into second chamber; and removing said hydrogen through said hydrogen gas outlet.

13. The method of claim 11, wherein the source of at least a portion of said admixture is the reformation of hydrocarbon fuel.

14. The method of claim 11, wherein said hydrogen gas does not undergo a chemical reaction in said solution.

15. The method of claim 3, further comprising removing unreacted carbon dioxide gas from said solution.

16. The method of claim 15, further comprising storing said unreacted carbon dioxide as a gas.

17. The method of claim 16, further comprising chemically storing said unreacted carbon dioxide as an insoluble carbonate salt.

18. The method of claim 3, further comprising providing sulfur to said solution, contacting said sulfur with said manganese (II) ion and allowing a sulfur containing manganese compound to precipitate.

19. The method of claim 3, said solution further comprising cations capable of forming insoluble sulfur salts and the method further comprising contacting said cations with sulfur and allowing said insoluble sulfur salts to precipitate.

20. The method of claim 19, wherein said sulfur is in a form the group consisting of selected from sulfide, sulfate and sulfite.

21. An apparatus for producing oxygen and absorbing carbon dioxide comprising:
    a tank containing an aqueous solution comprising a chemical species capable of reacting with carbon dioxide to form an insoluble precipitate, an oxygen source and a redox partner, said oxygen source and said redox partner reactable to form oxygen, and said tank comprising a material that does not catalyze the reaction of said oxygen source and said redox partner;
    a catalyst for catalyzing the reaction of said oxygen source and said redox partner positioned in said tank to contact the aqueous solution;
    a carbon dioxide inlet in said tank positioned to introduce carbon dioxide into the solution; and
    an oxygen outlet in said tank positioned to allow oxygen gas to escape.

22. The apparatus of claim 21, said carbon dioxide inlet comprising a diffuser.

23. The apparatus of claim 21, said catalyst selected from the group consisting of iron, copper, nickel and platinum.

24. The apparatus of claim 21, said material selected from the group consisting of polytetrafluoroethylene and carbon fiber.

25. The apparatus of claim 21 wherein said oxygen source and said redox partner comprise hydrogen peroxide and a permanganate salt and said chemical species capable of reacting with carbon dioxide comprises manganese (II) ion.

26. An apparatus for producing oxygen and absorbing carbon dioxide comprising:
    a tank for receiving an aqueous solution, comprising a material that does not catalyze the reaction of permanganate ion with hydrogen peroxide;
    a catalyst for reacting a permanganate salt with hydrogen peroxide to produce oxygen positioned in said tank to contact the aqueous solution when added to said tank;
    a carbon dioxide inlet in said tank positioned to introduce carbon dioxide into the solution when added to said tank;
    an oxygen outlet in said tank positioned to allow oxygen gas to escape; and
    at least one plate separating said tank into at least a first and a second fluidly coupled chamber, said first chamber comprising said carbon dioxide inlet and a hydrogen gas outlet and said second chamber comprising said oxygen outlet.

27. The apparatus of claim 26, said carbon dioxide inlet comprising a diffuser.

28. The apparatus of claim 26, said catalyst selected from the group consisting of iron, copper, nickel and platinum.

29. The apparatus of claim 26, said oxygen outlet comprising a membrane selectively permeable to oxygen.

30. The apparatus of claim 26, said hydrogen gas outlet comprising a membrane selectively permeable to hydrogen.

31. The apparatus of claim 26, said material selected from the group consisting of polytetrafluoroethylene and carbon fiber.

32. A system for generating power comprising:
    a power generator for generating power or electricity, and
    an integrated oxygen generator/carbon dioxide absorber, said integrated oxygen generator/carbon dioxide absorber providing oxygen to said power generator and absorbing waste carbon dioxide from said power generator;
    said integrated oxygen generator/carbon dioxide absorber comprising:
        a tank comprising a material that does not catalyze the reaction of permanganate ion with hydrogen peroxide,
        an aqueous solution comprising a permanganate salt and hydrogen peroxide contained in said tank,
        a catalyst in contact with said aqueous solution for catalyzing the reaction of said permanganate salt with said hydrogen peroxide to produce oxygen,
        a carbon dioxide inlet in said tank positioned to introduce carbon dioxide into said aqueous solution and
        an oxygen outlet in said tank positioned to allow oxygen gas to escape from said tank.

33. The system of claim 32, said power generator comprising an apparatus selected from the group consisting of a turbine, a fuel cell, an internal combustion engine and a heat powered engine.

34. The system of claim 33, said heat powered engine comprising a Brayton cycle engine or Sterling engine.

35. The system of claim 32, said power generator comprising a fuel cell and a reformer operative to convert a hydrocarbon into hydrogen and carbon dioxide; said reformer coupled to said $CO_2$ inlet;
    said fuel cell utilizing hydrogen and oxygen as an energy source; and
    said oxygen generator/carbon dioxide absorber further comprising a hydrogen outlet and a partition separating said tank into two or more fluidly coupled chambers wherein said carbon dioxide inlet and said hydrogen outlet are in the same chamber and said hydrogen outlet and said oxygen outlet are in different chambers;
    said hydrogen outlet comprising a membrane selectively permeable to hydrogen;
    said oxygen outlet comprising a membrane selectively permeable to oxygen;
    said hydrogen outlet fluidly connected to said fuel cell for allowing hydrogen to flow from said oxygen generator/carbon dioxide absorber to said fuel cell; and
    said oxygen outlet fluidly connected to said fuel cell for allowing oxygen to flow from the oxygen generator/carbon dioxide absorber to the fuel cell.

36. The system of claim 35, wherein said reformer is fluidly connected to said carbon dioxide inlet for allowing carbon dioxide and hydrogen to flow from said reformer to said oxygen generator/carbon dioxide absorber.

37. The system of claim 35, said fuel cell comprising a PEM fuel cell,
said oxygen outlet fluidly coupled to the cathode of said PEM fuel cell and
said hydrogen outlet fluidly coupled to the anode of said PEM fuel cell.

38. The system of claim 35, said hydrocarbon selected from the group consisting of diesel fuel, methanol, fuel oil, ethanol and gasoline.

39. The system of claim 32, wherein said power generator comprises a hydrocarbon direct fuel cell comprising a waste outlet, and
said waste outlet fluidly coupled to said carbon dioxide inlet.

40. The system of claim 39, said hydrocarbon selected from the group consisting of methanol, ethanol, diesel fuel and gasoline.

41. The system of claim 32, wherein said power generator comprises a turbine powered by combustion of a hydrocarbon fuel, said turbine comprising an exhaust outlet for exporting waste from combustion of said hydrocarbon fuel,
said exhaust outlet fluidly coupled to said carbon dioxide inlet.

42. The system of claim 32, said power generator comprising a heat powered engine heated by combustion of hydrocarbon fuel and comprising an exhaust outlet for exporting waste from combustion of said hydrocarbon fuel, said exhaust outlet fluidly coupled to said carbon dioxide inlet.

43. The system of claim 42, said heat powered engine selected from the group consisting of a Brayton cycle engine and a Sterling engine.

* * * * *